United States Patent [19]

Chelminski

[11] 4,240,518
[45] Dec. 23, 1980

[54] METHOD AND APPARATUS FOR MONITORING AND CONTROLLING A MULTIPLICITY OF AIR GUNS FOR SEISMIC SURVEYING

[75] Inventor: Stephen V. Chelminski, West Redding, Conn.

[73] Assignee: Bolt Associates, Inc., Norwalk, Conn.

[21] Appl. No.: 917,794

[22] Filed: Jun. 22, 1978

[51] Int. Cl.³ .................................... G01V 1/38
[52] U.S. Cl. .................... 181/107; 181/111; 181/120; 367/144
[58] Field of Search .................. 181/107, 111, 120; 367/144

[56] References Cited

U.S. PATENT DOCUMENTS

| | | | |
|---|---|---|---|
| 3,249,177 | 5/1966 | Chelminski | 181/120 |
| 3,379,273 | 4/1968 | Chelminski | 181/0.5 |
| 3,588,039 | 6/1971 | Chelminski et al. | 181/120 |
| 3,687,218 | 9/1972 | Ritter | 181/107 |
| 3,779,335 | 12/1973 | Chelminski | 181/0.5 |
| 3,800,832 | 4/1974 | Umphenour et al. | 181/120 |
| 3,985,199 | 10/1976 | Baird | 181/107 |
| 3,997,021 | 12/1976 | Cheminski | 181/119 |
| 4,034,827 | 7/1977 | Leerskov, Jr. et al. | 181/107 |
| 4,106,585 | 8/1978 | Huizer | 181/107 |
| 4,114,723 | 9/1978 | Paitson | 181/120 |
| 4,141,431 | 2/1979 | Baird | 181/107 |

Primary Examiner—Howard A. Birmiel
Attorney, Agent, or Firm—Parmelee, Johnson, Bollinger & Bramblett

[57] ABSTRACT

Firing of a seismic source of the type called an air gun is detected by means of a fluid pressure sensor located in the housing of a solenoid actuated control valve. Through a pressurized gas support port the pressure sensor is in fluid contact with a shuttle-operating chamber of the air gun, and the sensor detects a surge in fluid pressure resulting from rapid motion of the shuttle. if a misfire or malfunction of the air gun is detected by means of the fluid pressure sensor, the malfunctioning air gun can be shut down by actuating the solenoid valve, which is a novel dual action solenoid valve, thereby preventing pressurized gas from being supplied to that particular air gun. The valve includes a valve stem with radial gas inlet ports and radial triggering ports. A solenoid plunger is movable to close one or the other of the sets of ports. A chamfered seal-engaging lip and a shoulder on the plunger are in fluid contact with the gas inlet port and pressure forces on the lip and shoulder are balanced to reduce the electrical power requirements of the solenoid.

44 Claims, 13 Drawing Figures

METHOD AND APPARATUS FOR MONITORING AND CONTROLLING A MULTIPLICITY OF AIR GUNS FOR SEISMIC SURVEYING

BACKGROUND OF THE INVENTION

This invention relates to the generation of seismic energy in a medium by the use of seismic sources of the type called air guns, and more particularly to a method and apparatus for monitoring the firing of such air guns in order that the actual instant of firing of each gun may be known and accurately controlled, for example so that the guns may be synchronized, and for shutting down an air gun which misfires or malfunctions.

In seismic surveying in a medium such as water, acoustical energy is generated by air guns submerged in the water and is utilized to investigate subsurface geological conditions and formations. For this purpose, one or more of such air guns are submerged in the water; compressed air, or other gas or gases under pressure, is fed to the submerged guns and temporarily stored therein. At the desired instant, the seismic source air guns are actuated, i.e., fired, are pressurized gas is abruptly released into the surrounding water. In this manner powerful acoustic waves are generated capable of penetrating deeply into subsurface material to be reflected and refracted therein by the various strata and formations. The reflected or refracted acoustical waves are sensed and recorded to provide information and data about the geological conditions and formations.

It is also possible to submerge such seismic sources in marsh land, swamp or mud areas which are infused with sufficient water that the seismic surveying apparatus described herein can be used. Accordingly, the term "water" as used herein is intended to include marsh land, swamp or mud which contains sufficient water to enable such apparatus to be used.

It has been found advantageous in marine seismic exploration to generate a plurality of acoustic waves from an array of air guns in order to provide a composite acoustic wave of satisfactory amplitude and frequency content. Air guns having various volume capacities are generally utilized in such arrays in order to produce a composite acoustic wave having a broad frequency band, as air guns of different volumes generate acoustic waves with different frequency spectrums. For further background on air guns and solenoid valves reference may be made to Pat. Nos. 3,249,177; 3,379,273; 3,779,335; 3,588,039; 3,653,460; 3,997,021 and 4,038,630 in which I am the inventor or joint inventor.

In the past, attempts have been made to synchronize the timing of the solenoid-controlled valves which trigger the individual air guns. However, the time at which a solenoid plunger actually becomes actuated in response to an electrical signal will vary with each valve, and then there are further variables caused by the mechanical structure of each air gun, such as dimensional tolerance variations, wear of parts, slight differences in shuttle mass, different frictional drag of moving parts, and so on. When the individual air guns are not actually operating in accordance with the prescheduled precisely timed relationship, then the downgoing seismic waves are not in accordance with the predetermined survey program, and less than optimum results are obtained. For example, if the survey program calls for all of the air guns to fire in synchronism, and they are not synchronized, the downgoing seismic waves are misaligned. Misalignment may cause reduction in total amplitude of the downgoing seismic waves or cause the generation of seismic waves with undesirable frequency spectra, or both, resulting in data collection with reduced penetration and resolution.

A solution to the problem of inaccurate firing ("shot") instant as set forth in U.S. Pat. Nos. 4,034,827 and 4,047,591 assigned to Texas Instruments, Incorporated has been to sense movement of a gas-releasing shuttle within each air gun by magnetic, electromagnetic or electrostatic field effects to establish the precise instant of firing of each individual air gun. The firing signals applied to the respective air gun solenoids are then delayed or advanced relative to each other in subsequent firings to properly synchronize or sequence the firings of the respective air guns. In those patents, the air guns are modified in order that a field such as a magnetic field be set up. The air guns are further modified in order that variations in that field caused by movement of the shuttle can be detected.

In the final paragraph of each of the above patents, possible arrangements for producing a magnetic, electromagnetic or electrostatic field and sensing variations in that field were listed. A primary disadvantage of each of the embodiments suggested in these patents is that one or more complex modifications of the air gun itself is required. Such modification of an air gun to include means for generating a magnetic, electromagnetic or electrostatic field plus means to sense variations in that field are generally complicated procedures which cannot be accomplished by an operating crew, and even such modification of air guns yet to be manufactured is costly. Further, any repairs by an operating crew to a sensor which is built into the air gun is time-consuming and costly.

An object of this invention is to provide a sensor for sensing movement of an air gun shuttle to signal the instant of firing of that shuttle, such sensor requiring little if any modification to the basic air gun structure and allowing for ease in replacement of the sensor.

To enable a marine survey crew to shut down individual air guns in the system, it is common practice to run a separate high pressure gas supply line to each individual air gun. Then, operation of an air gun can be discontinued by closing a valve on board the surveying vessel for shutting off the flow of pressurized gas through the supply line for that air gun.

A further object of this invention is to provide means for individually shutting down an air gun in the event of misfiring or malfunctioning of the gun, even where all guns in a system are being supplied with pressurized gas through a common line, such means for shutting down any particular gun requiring only minor modification of the air gun control.

As used herein, the term "gas" is used in a broad sense to include any compressible gaseous fluid which may be utilized in an air gun, and it includes (but is not limited to) air, steam, nitrogen, carbon dioxide, gaseous products of combustion, and mixtures thereof.

As used herein, the term "misfire" or similar wording means the same thing as "no fire" as used in said patents of Texas Instruments, and it also includes a condition of continuous leakage of pressurized gas from an air gun, as may be caused when the shuttle does not reseat itself in sealed condition after firing such that the gun begins to leak continuously without firing. The term "malfunction" or similar wording means the same thing as "auto fire" as used in said patents.

SUMMARY

In accordance with the invention in one of its aspects, movement of the air gun shuttle is detected by a fluid pressure sensor responsive to variations in fluid pressure caused by movement of the shuttle.

In accordance with further aspects of the invention, the fluid pressure sensor is housed in the housing of the solenoid-actuated valve, and the sensor and solenoid valve are in fluid contact with the shuttle operating chamber through a common port.

In accordance with further aspects of the invention, the feed of pressurized gas to the air gun is shut off when the solenoid valve is actuated (or energized), and the solenoid can be continuously actuated when a signal from the pressure sensor indicates a misfire or malfunctioning of that air gun, thereby preventing further pressurized gas from entering the gun.

In accordance with further aspects of the invention, the solenoid-actuated valve includes a valve stem having a radial pressurized-gas inlet port and an axially spaced radial control port. A plunger is axially movable, upon actuation of the solenoid valve, from a first position in engagement with a first seal to a second position in engagement with a second seal. When in its first position, the plunger closes the control port and not the gas inlet port and when in its second position, it closes the gas inlet port and not the control port. The plunger has a seal engaging lip and a shoulder adjacent to and in fluid contact with the gas inlet port when the plunger is in its second position. The lip and shoulder define oppositely directed surfaces, and fluid pressure on the shoulder balances fluid pressure on the lip to reduce the electrical power input requirements of the solenoid. Further, the lip is chamfered with its slope toward the gas inlet port to provide a well-defined seal line.

BRIEF DESCRIPTION OF THE DRAWINGS

The foregoing and other objects, features, and advantages of the invention will be pointed out in or become apparent from the following more particular description of a preferred embodiment of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION

Figure 1:
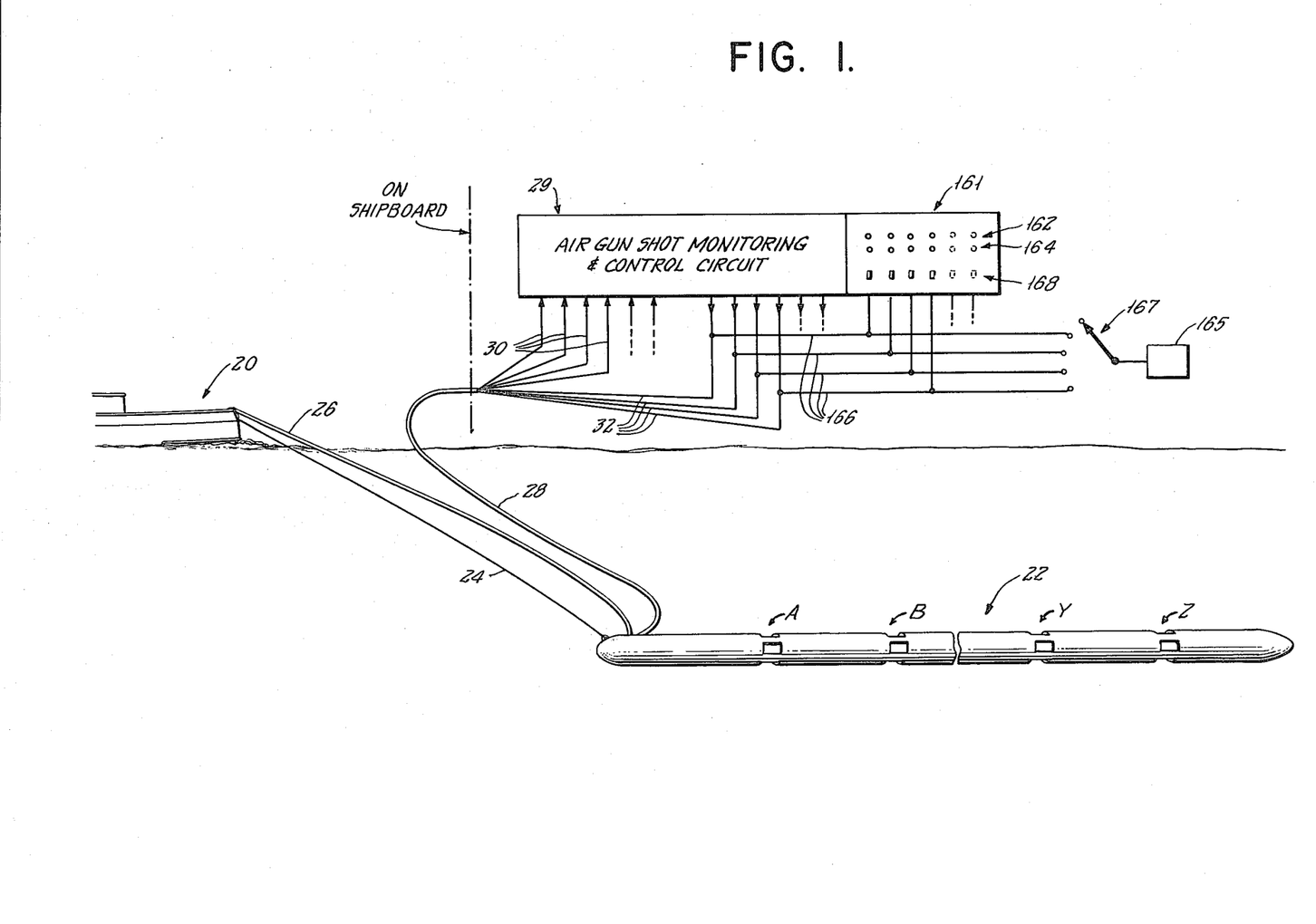
FIG. 1 illustrates a seismic survey vessel towing a multiple air gun marine seismic survey streamer. For illustrative purposes, the multiple air gun streamer is shown enlarged relative to the towing vessel, and a block illustration of the monitoring and control circuitry is shown enlarged at the upper right.

As shown in FIG. 1, a survey vessel 20 tows a streamer of air guns 22 by a tow line 24. The streamer 22 is preferably of the type disclosed in my prior patent 4,038,630 and supports a multiplicity of air guns, of which four, A, B, Y and Z, are shown. However, other arrangements as known in the art for towing a multiplicity of air guns may be used. High pressure gas is supplied to the guns through a gas supply line 26 from the vessel 20. Although this is shown as being a single high pressure hose line for supplying all of the air guns in common, it will be understood that more than one gas supply line may be used. For example, a plurality of gas supply lines may be used with each line supplying a plurality of air guns in common. It is among the advantages resulting from using this invention that it is not necessary to employ an individual gas supply line extending from the vessel 20 to each air gun, because an individual air gun can be shut off even though it is being supplied with pressurized gas through a supply line in common with one or more other air guns.

Each air gun within the streamer is fired by an electrical trigger pulse received through a multiple line electric cable 28. These trigger signals are transmitted through the cable 28 along individual electrical firing control lines 32 from an air gun shot monitoring and control circuit 29.

In order to accurately monitor the actual firing of the several air guns, a sensor signal is transmitted from each air gun along an individual electrical line 30 within the cable 28 to the air gun shot monitoring circuit.

To cause each of the air guns to fire precisely in accordance with its preselected desired timed relationship, i.e. synchronously or in timed sequence, the monitoring and control circuit 29 then advances or delays particular ones of the signals being fed into the respective firing control lines 32 in order to bring their actual firings into accordance with the predetermined survey plan.

The signalling of a misfire (no fire) and malfunction (auto fire) and the sensing of the shot instant for each air gun may be accomplished by any appropriate circuitry within the control circuit 29 connected to the sensor signal line 30, for example such as taught in the Texas Instruments patents, and the respective trigger signal pulses applied to the control lines 32 may be delayed or advanced as taught there.

A novel aspect of this method and system embodying the present invention is that the respective firing control lines 32 can be used to shut the supply of pressurized gas off from any misfiring of malfunctioning air gun. This shut off of an individual gun is accomplished by transmitting a continuous electrical current through the corresponding control lines 32 for that gun, as will be explained in detail further below.

Figure 2:
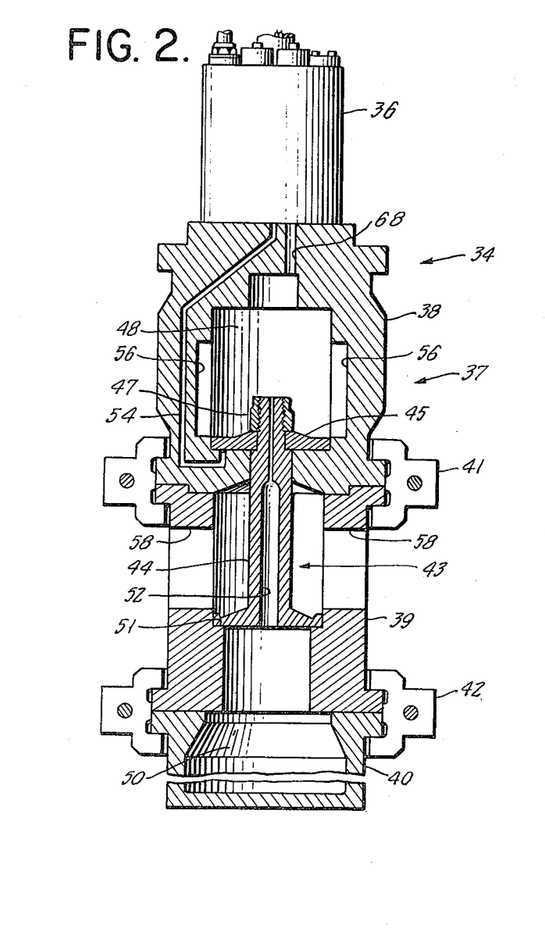
FIG. 2 is a side view of an air gun assembly with the air gun and its shuttle shown in section and a solenoid-actuated valve housing at the top.
Figure 3:
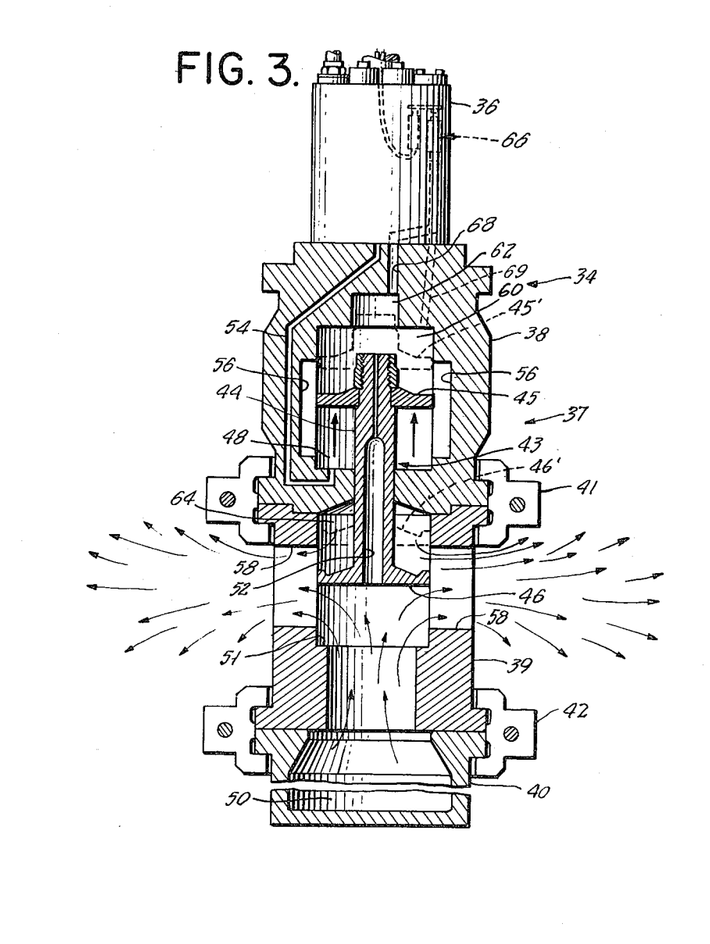
FIG. 3 is a side view similar to FIG. 2 but illustrating firing of the air gun and showing a pressure sensor in broken lines in the housing of the solenoid-actuated valve.

Each air gun in the streamer 22 is of the type indicated at 34 in FIGS. 2 and 3. The air gun 34 includes a housing 36 for the solenoid-actuated valve and a housing assembly 37 in which the shuttle is located. The components within the housing 36 for the solenoid valve embody the present invention and will be described in detail subsequently.

The housing assembly 37 of the air gun 34, and the general operation of that portion of the air gun is conventional, there being no major modifications to air gun 34 itself. The housing 37 includes three sections, the operating chamber section 38, the discharge port (or intermediate) section 39, and a charge chamber section 40, sometimes called the firing chamber. These sections are united to form a single unit by removable clamps 41 and 42. The use of a removable section as the charge chamber section 40 is particularly advantageous in that the volume of the pressurized gas storage, and thus the frequency and characteristics of the resulting seismic signal, may be readily changed by changing the charge chamber section.

The primary moving element of the air gun is a shuttle 43 which includes a central shaft 44, an upper piston element 45, and a lower piston element 46. The piston element 45 is joined to the shaft 44 by a locknut 47. It rides in an operating chamber 48 and controls discharge of the air gun. The lower piston element 46 rests on a seat 51 to close a pressurized gas charge chamber 50.

In the charged condition, as shown in FIG. 2, pressurized gas, for example such as compressed air, is supplied through a passage 68 and fills the operating chamber 48, and that pressurized gas presses down on the shaft 44 and on piston element 45 to hold the shuttle 43 in its lowermost position, which is called the closed position. In that position, the charge chamber 50 is closed by piston element 46, and a charge of pressurized gas, having passed from the operating chamber 48 through a bore 52 in the shuttle shaft, is retained in the charge chamber. The surface area of the shuttle 43 exposed to pressurized gas in the charge chamber 50 is somewhat less than the area exposed to pressurized gas in the operating chamber 48. Thus, the resultant forces act downward on the shuttle and hold it in the position shown in FIG. 2.

To fire the air gun, pressurized gas is applied through a trigger passage 54 to the bottom surface of the upper piston element 45. The force applied by the gas from the passage 54 pushing upwardly on the upper piston element is sufficient to unbalance the previous resultant downward force on the shuttle, and causes the shuttle to move rapidly upwardly. The seat 51 for the lower piston 46 is sufficiently deep that the charge chamber remains closed within initial movement of the shuttle. Then, the upper piston 45 reaches bypass passages 56 formed in the side of the operating chamber. At that point, pressurized gas in the operating chamber 48 is free to move from above the piston 45 to below it, thereby tending to equalize the pressure forces applied to that piston, and the shuttle quickly accelerates upwardly driven by the force of the pressurized gas in the charge chamber 50. With the shuttle accelerating abruptly upwardly, the charge chamber is opened, and pressurized gas pushes with explosive-like forcefulness out through discharge ports 58 to create a powerful seismic impulse.

The bypass passages 56 do not extend to the top of the operating chamber 48. Thus, as the piston element 45 travels above the upper ends of those passages, as shown by broken lines 45' in FIG. 3, gas becomes trapped in the upper portion 60 of the operating chamber 48 and in a reduced-diameter upper portion 62. This trapped gas acts as a shock absorber and acts to bring the shuttle to a hault and then to drive it back down towards its closed position. Similarly, water is trapped in a space 64 above the lower piston as shown at 46' to help stop the upward movement of the shuttle.

It is the above described abrupt acceleration of the shuttle 44 toward the upper portion 60, 62 of the operating chamber which is detected to provide an indication of the exact firing time of the air gun. In accordance with the present invention, a fluid pressure sensor 66 is positioned in the solenoid-actuated valve housing 36. This sensor is in fluid contact with the upper portion 60, 62 of the operating chamber and detects the abrupt rise in fluid pressure within this upper portion of the chamber 48 with the approach of the fast-moving shuttle. Advantageously, this invention enables the sensors for detecting the exact firing time of the air guns to be located in the housing 36 for the solenoid valve. If the air supply passages for the air guns are appropriately located, no modification of the air guns may be necessary. The present invention takes advantage of the abrupt pressure rise occurring in the upper portion of the operating chamber of an air gun upon firing of the gun.

The above described components of the air gun housing assembly 37 are completely conventional, except possibly for the location of the gas supply passage or port 68, and the sensor passage 69 which may advantageously be used. The gas supply passage or port 68 through which pressurized gas is supplied to the operating chamber may also advantageously be employed as the port through which the gas pressure in the upper portion 60, 62 of the operating chamber is sensed. As in conventional air guns, the gun is triggered by energization of a solenoid winding which moves a valve plunger to open a fluid passage between the passage 68 and the trigger passage 54.

Figure 4:
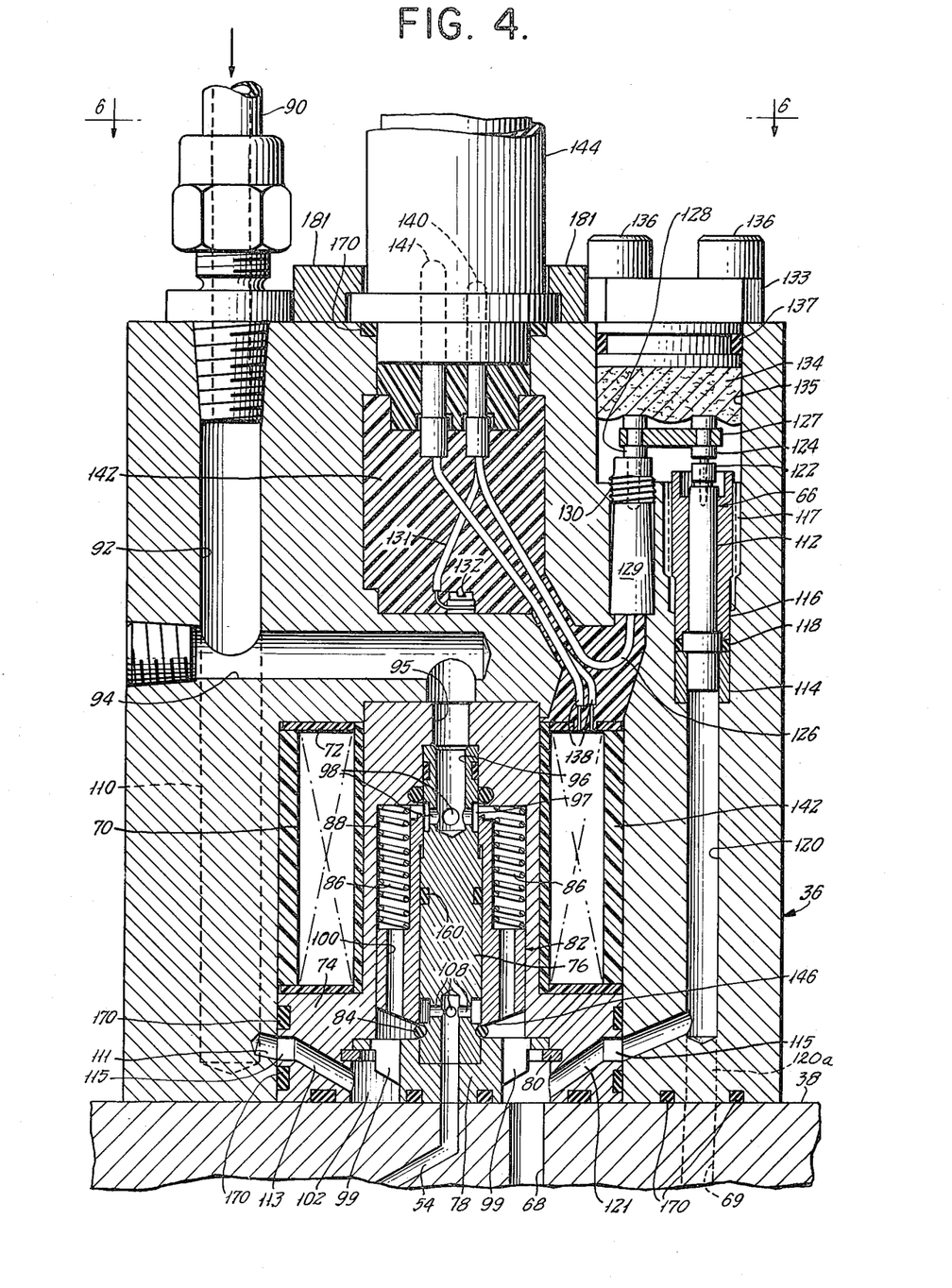
FIG. 4 is an enlarged elevational sectional view of the solenoid-actuated valve with a pressure sensor advantageously mounted within this housing.

The components within the valve housing 36 are shown in detail in FIG. 4. A solenoid coil 70 wound about a bobbin 72 rests on a plunger housing 74 within the valve housing 36. A valve stem 76 is firmly seated in the upper end of the plunger housing 74 and is held there by a retainer 78. The retainer 78 is held against the plunger housing 74 by a snap retainer ring 80.

Figure 9:
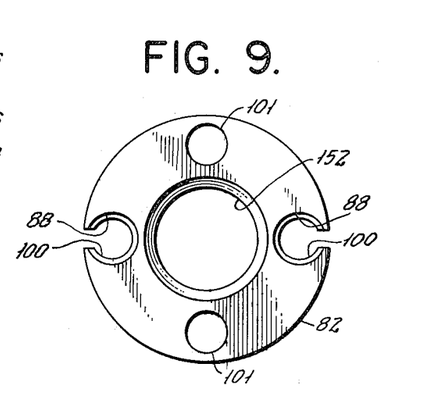
FIG. 9 is a top view of the plunger used in the solenoid valve of FIGS. 4 and 5.

A valve plunger 82 is also located within the plunger housing 74 and encircles the valve stem 76. In the nonenergized condition of the solenoid, the plunger 82 is forced downwardly against an O-ring seal 84 by two springs 86 shown in FIG. 4. The springs 86 are positioned in cylindrical axially extending cavities 88 in the plunger 82. This valve plunger 82 is shown separately in FIGS. 9 and 10.

With the valve plunger in the nonactuated position shown in FIG. 4, pressurized gas may flow from the supply line 90 through axially and radially extending passages 92 and 94, respectively, in the valve housing to a gas inlet passage 95 concentrically located in the upper end of the plunger housing 74 which communicates with an axial passage 96 in the valve stem 76. The supply flow continues through radial gas inlet ports 98 in the valve stem communicating with an annular groove 97 in the valve stem and then into the spring cavities 88 and into axially extending passages 100 and 101 (FIG. 9) in the valve plunger itself. The air flows past the O-ring seal 84 passing down through longitudinally extending passageways 99 in the retainer 78 leading into an annular inlet chamber 102. This annular chamber 102 is formed by the retainer 78, and an annular space in the plunger housing 74. From this inlet chamber 102, the pressurized gas is free to flow through the gas supply port 68 into the operating chamber 48 (FIGS. 2 and 3) and then from the operating chamber through the bore 52 in the shuttle into the charge chamber 50.

When the solenoid coil 70 is energized by a trigger pulse, magnetic flux is set up in a magnetic circuit extending through the magnetically permeable housing 36, plunger housing 74 and plunger 82. The plunger is drawn upwardly and acts to close a gap in the flux path at the top end of the plunger. It thus moves upwardly a small distance, as shown in FIG. 5, toward the upper portion of the plunger housing against the force of springs 86.

With the solenoid valve thus actuated, the lip 104 (FIG. 4) near an annular step 105 at the upper end of the plunger 82 moves up against an O-ring seal 106 to close the four gas inlet ports 98. With the same motion, the plunger moves away from the lower O-ring seal 84 (as seen in FIG. 5), to open the four radial control ports 108. With these control ports open, a fluid passage is opened from the operating chamber 48 through gas supply passage 68, inlet chamber 102, passageways 99, control ports 108 and trigger passage 54. As a result, and as previously explained, the gas pressure forces now applied to the lower side of the upper piston element 45 allow the shuttle 43 to move rapidly upwardly, with the pressurized gas in the charge chamber 50 accelerating the shuttle 43 upwardly to a high velocity (FIG. 3) to fire the air gun and generate a powerful seismic impulse in the surrounding water.

The control ports 108 through the valve stem 76 are similar to those shown in the U.S. Pat. No. 3,588,039. However, in that patent and other air gun apparatus, the pressurized gas supply is not through the valve stem. For example, in prior air guns as shown in U.S. Pat. Nos. 3,563,460; 3,800,907; 3,707,848; and 3,808,822 the pressurized gas passes through a passage leading directly into the operating chamber section 48; in other words, in the prior air guns the gas supply passage is located entirely outside of the solenoid valve housing 36. Advantageously, with employment of the present invention, once a misfire or malfunction is detected by the fluid pressure sensor to be discussed subsequently, the misfiring or malfunctioning air gun may be shut down conveniently by energizing the coil 70 of the solenoid valve, thereby closing the gas inlet ports 98. Due to the novel dual action arrangement of the solenoid valve in which the solenoid 70 controls both the triggering of the air gun and the supply of the pressurized gas to the air gun, it is not necessary that each air gun be connected to a separate pressurized gas supply line extending from the survey ship 20. (For example, the two Texas Instruments patents discussed above show separate air supply lines running to each air gun).

Figure 5:
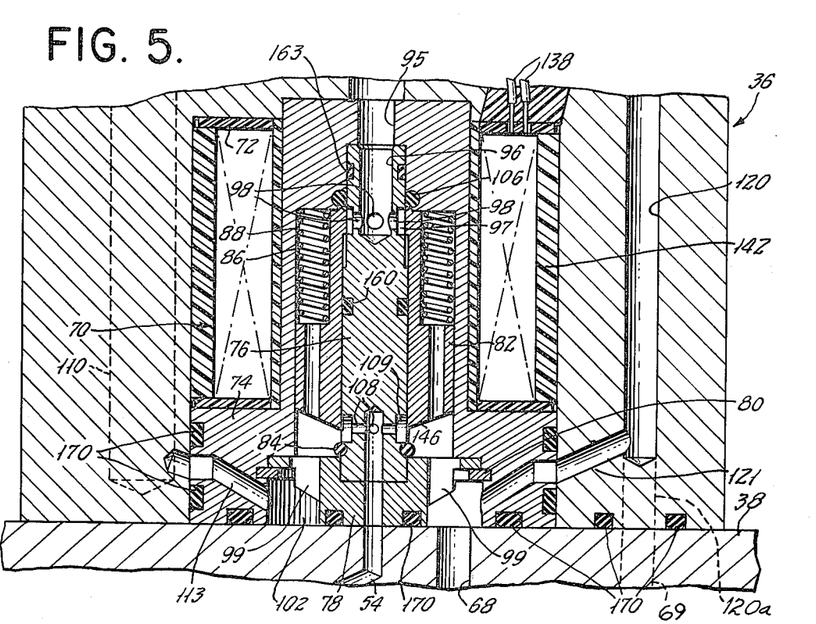
FIG. 5 is a sectional view of the lower portion of the valve housing of FIG. 4, but showing the position of the plunger when the solenoid has been actuated (energized)

If the user wishes to feed the pressurized gas directly into the annular inlet chamber 102, without using the solenoid valve as a shut off valve, the passages 94, 95, 96, 98 may be omitted or passage 94 may be plugged, and a bypass passage 110, as shown dotted in FIGS. 4 and 5, may be drilled in the housing 36, forming an extension of inlet passage 92. This bypass passage 110 communicates through a passageway 111 with an annular groove 115 and a passage 113 in the plunger housing 74 which leads into the annular space 102.

As discussed in prior U.S. Pat. No. 3,588,039, the size of the solenoid springs 86 can be reduced by balancing the forces on the plunger 82 resulting from the high pressure gas. In that patent, the pressurized fluid is pressed against each end of the plunger to effect the balancing. Further, to provide a well-defined sealing lip of the O-ring seal against the plunger, the lower end of the plunger is chamfered as shown in the present valve at 146 in FIGS. 4, 5 and 10.

With the present solenoid valve, an additional seal 106 is provided at the upper end of the plunger 82, making it serve the function of closing the gas inlet ports 98.

Figure 7:
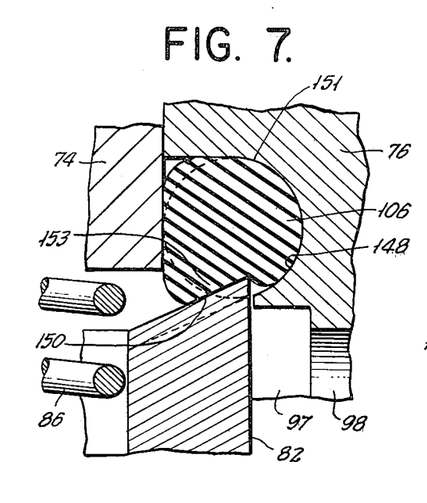
FIG. 7 is an enlarged elevational sectional view of a possible seal arrangement at the upper end of the solenoid valve plunger of FIGS. 4 and 5.

It might appear at first glance that the desirable arrangement would be to make the upper end of the plunger 82 an upside-down version of the lower end, in other words to employ a chamfered upper end 150 as shown in FIG. 7. In FIG. 7, the O-ring seal 106 is shown seated in an outwardly facing annular groove 148 in the valve stem 76. A careful analysis of this possible sealing arrangement as shown in FIG. 7 reveals a disadvantage which may become understood by the reader by considering what will happen if some high pressure air seeps up along the groove 148 past the O-ring 106 into the region 151 above the O-ring. This leaked gas would press downwardly against the O-ring seal 106 causing the O-ring to become deformed as shown at 153 and thus to roll or press down upon the sloping surface 150. This downward thrust of the deformed O-ring on the plunger increases with increased deformation (i.e. with more contact on surface 150) and would add to the downward force of the springs 86 and thus would tend to oppose the desired shut off action. To overcome this combined downward thrust caused by the deformed O-ring plus the spring action would require a strong magnetic upward pull to be created by the energized solenoid winding 70.

Figure 8:
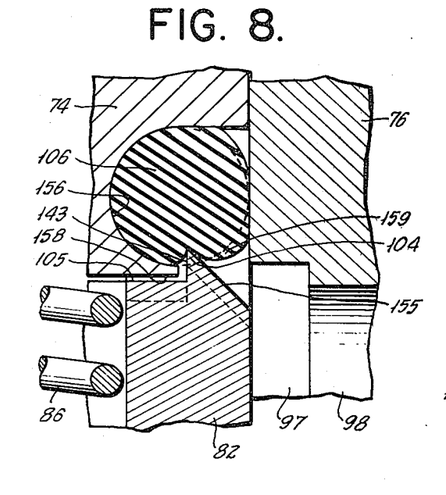
FIG. 8 is an enlarged elevational sectional view of the preferred seal arrangement actually shown in FIGS. 4 and 5 at the upper end of the solenoid valve plunger.

To avoid the above result, the bore 157 (FIG. 10) of the plunger 82 includes an inwardly extending annular portion 152 which provides a vertically upwardly extending cylindrical surface 143 which extends up from the step 105 to define an annular lip 104. There is an inwardly and downwardly sloping conical surface 155 extending downwardly along the lip 104, and there is an annular shoulder 154 (FIG. 10) in the bore 157 located below the inwardly extending annular portion or ridge 152. Both the sloping surface 155 and the shoulder 154 are adjacent to and in fluid contact with the gas inlet ports 98 when the plunger is in position as shown in FIGS. 5 and 8 to close those ports. Thus, the high pressure gas forces act downwardly against the sloping surface 155 and upwardly against the shoulder 154 to balance the forces on the plunger 82. The cylindrical surface 143 is the same diameter as the bore 157.

Even though the O-ring seal 106 may become deformed somewhat as shown at 159 in FIG. 8, there is no net increase in the effective area under gas pressure acting downwardly, and thus the downward force on the surface 155 remains almost constant. Thus, advantageously, the plunger remains balanced regardless of the amount of contact of the deformed 159 O-ring on the sloping surface 155.

O-ring seals 160 and 163 (FIGS. 4 and 5) seated in circumferential grooves in the valve stem 76 prevent leakage. The seal 160 provides a sliding seal against the enlarged plunger bore 157 below the annular shoulder 154. Thus the pressurized gas cannot leak down into the control ports 108. It is to be noted that there is a circumferential groove 109 (FIG. 5) surrounding the valve stem at the location of the control ports 108 for increasing the flow capacity through these ports. Such an annular groove was also shown in U.S. Pat. No. 3,588,039.

Figure 10:
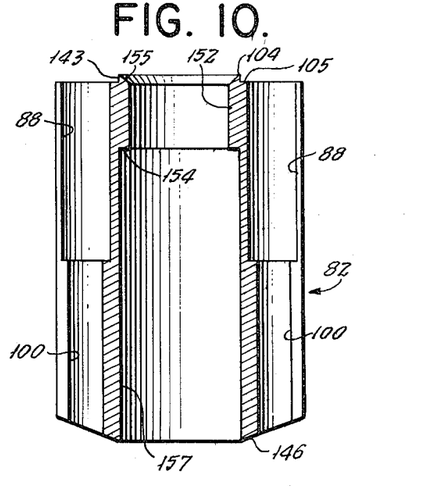
FIG. 10 is an elevational sectional view of the plunger of FIG. 9.

Again turning attention to the O-ring seal 106 (FIG. 8) it is noted that this O-ring 106 is seated in an inwardly facing groove 156 in the plunger housing 74 so that the force applied against the seal 106 by any leaked gas causes the deformed O-ring to act either against an overhand 158 of the plunger housing 74 or against the sloping surface 155 of the plunger as discussed above. Pressure forces against the sloping surface 155 either directly or through the seal 106 as deformed at 159 are offset by gas pressure pushing upwardly against the shoulder 154 (FIG. 10).

As can be seen in FIG. 8, the above described sealing arrangement has the further advantage of providing very close magnetic coupling between the plunger 82 and the plunger housing 74 when the solenoid valve is actuated. The overhanging portion 158 of the plunger housing 74 has a lower radial surface as seen in FIG. 8 which is closely spaced to and parallel with the radial step surface 105 on the plunger. By virtue of the small gap which is provided between these closely spaced parallel surfaces 158, 105, the reluctance in the magnetic circuit is significantly reduced when the plunger is in its upper position as shown in FIGS. 5 and 8 as compared with the reluctance which would be present with the arrangement shown in FIG. 7. Thus, the amount of electrical power required to retain the plunger in its upper, shut-off position as shown in FIGS. 5 and 8 is substantially reduced over what would have been required with the arrangement as shown in FIG. 7.

Figure 11:
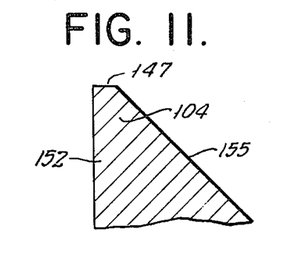
FIG. 11 is a greatly enlarged view of the sealing lip at the top of the plunger of FIG. 10.
Figure 12:
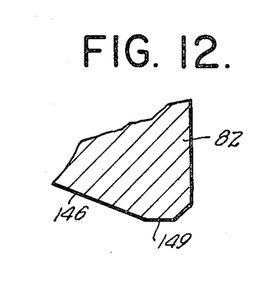
FIG. 12 is a greatly enlarged view of the lower sealing end of the plunger of FIG. 10.

The sloping 155 of the lip 104 provides for a well-defined lip to engage the seal 106. Although shown as terminating at a sharp edge in FIGS. 8 and 10, the shapes of the annular lip 104 and lower end 146 of the plunger are actually as shown greatly enlarged in FIGS. 11 and 12. The flat blunted rims 147 and 149 simplify machining of the plunger and reduce wear to the seals 106 and 84.

A primary feature of the air gun embodying the invention is the fluid pressure sensor 66 positioned in the solenoid valve housing 36. The fluid pressure sensor as seen in FIG. 4, includes a transducer 112 held against a filler sleeve 114 by a bushing 116. This transducer may be of the magnetostrictive or piezoelectric type, for example such as the high-sensitivity pressure transducer model No. 112A03 obtainable commercially from PCB Piezotronics, Inc., P.O. Box 33, Buffalo, New York 14225. This particular transducer has a quartz element. The bushing 116 is screwed at 117 into a threaded socket in the solenoid valve housing 36 and presses an O-ring seal 118 against the filler sleeve 114. The seal 118 forms a tight fluid seal around the transducer 112. In this manner, the transducer 112 is in fluid contact with a sensor passage 120. The passage 120 communicates through a lateral passageway 121 in the plunger housing and thus is in fluid contact with the operating chamber 48 through the inlet chamber 102 and the gas supply port 68.

When the shuttle 43 is driven upwardly at high velocity with firing of the air gun, a sharply abrupt pressure surge occurs with momentary trapping and compressing of gas in the upper portions 60 and 62 of the operating chamber above the shuttle. This very sudden pressure surge occurring as the shuttle nears the top of its fast-moving stroke can be used as an accurate, dependable measure of the time of firing of the air gun. The transducer 112 responds to this pressure surge by generating an electrical signal pulse. This signal pulse is transmitted over one of the electrical lines 30 to the control circuit 29 and thereby provides information on the instant when the air gun has fired, which may be called the shot instant. The circuit from the transducer 112 to the electrical line 30 may be traced in FIG. 4 as follows. At the top of the transducer 112 is a terminal socket 122 into which is plugged a connector electrode 124 of a removable jumper contact assembly 127 having another connector electrode 128 plugging into an electrical socket 129 mounted in the housing 36 by screwing at 130 into a bore hole. The socket 129 is connected by an electrical lead 126 with a prong 140 adapted to be engaged by an electrical connector 144 as will be explained. There is a second prong 140 (not seen) aligned with the first one which is connected by a lead 131 with a grounding screw terminal 132. In this way the housing 36 is grounded, and the outside of the transducer 112 is grounded by its mounting in the housing 36. It will be understood that each of the electrical lines 30 includes a pair of electrical conductors. This conductor pair is connected to the two sockets (not shown) in the connector 141 which engage the pair of prongs 140 for completing the circuit from the transducer 112 to the control circuit 29.

The removable jumper contact assembly 127 is backed by a compressible resilient pad 134 in a bore hole 135 under the retainer cap 133. As shown in FIG. 4, this retainer cap has a portion which fits down into the bore hole 135 with a groove holding an O-ring 137 for providing a waterproof enclosure. This retainer cap is held in place by only four bolts 136. Thus, in the event of malfunction of the pressure sensor transducer 112 or in order to replace the sensor for any other reason, the cap 133 may be easily removed; the removable jumper contact assembly 127 can be unplugged, and transducer 112 may be unscrewed from its mounting to be readily removed for replacement.

Figure 6:
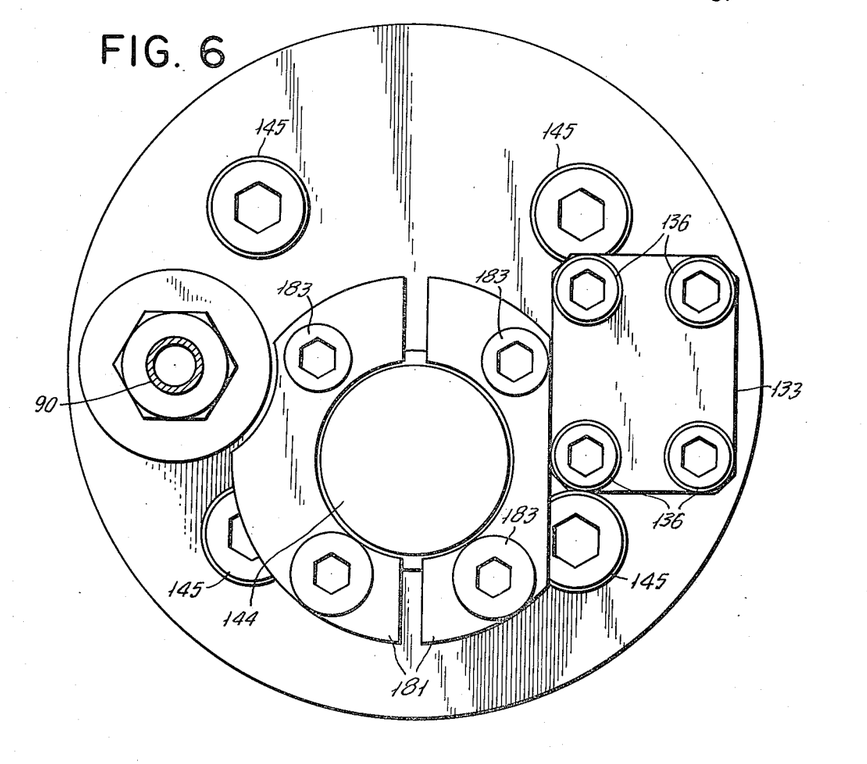
FIG. 6 is a top view of the housing of FIG. 4 as seen from the direction 6—6.

The two wires 138 to the solenoid winding 70, are connected to a pair of connector prongs 41 (only one is seen) and are embedded in an insulating potting material 142 which also embeds the leads 126 and 131 and the solenoid 70. The waterproof electrical connector 144 for each air gun is joined to the electrical cable 28. The connector also contains two sockets (not shown) which engage the respective prongs 141 and which are connected to the pair of conductors comprising one of the electrical lines 32. The connector 144 is secured in place by two C-clamps 181 (FIG. 6) which are removably held by bolts 183.

The entire solenoid valve housing 36 is mounted to the air gun housing assembly 37 by means of four bolts 183 (FIG. 6) which extend in an axial direction through the housing 36.

Figure 4A:
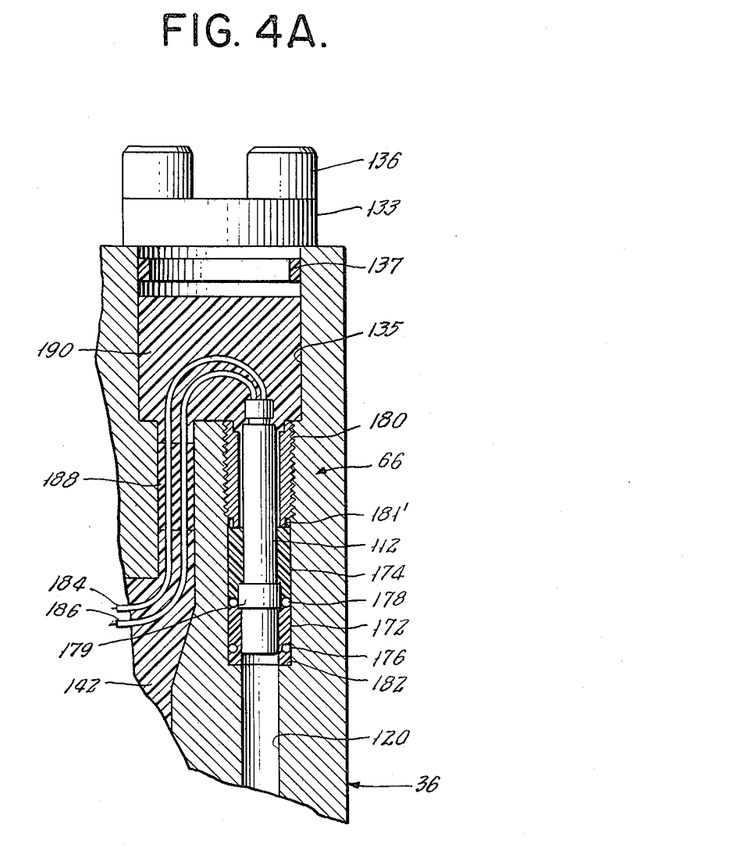
FIG. 4A shows an alternative transducer arrangement.

FIG. 4A shows an alternative means for mounting the transducer 112 within the solenoid valve housing 36. The lower end of the transducer 112 is encircled by two hard plastic sleeves 172 and 174. These sleeves may, for example, be of the plastic material sold under the trademark Delrin. An O-ring 176 is positioned in a groove in the outer circumferential surface of the lower sleeve 172, and an O-ring 178 is positioned between the two sleeves. The O-ring 178 surrounds an enlarged diameter portion 179 of the transducer 112. The plastic sleeves 172 and 174 are pressed downwardly against an internal shoulder 182 in the housing 36 by a steel nut 180 threaded into the housing. A clearance is provided between the nut and the transducer so that the transducer casing is not electrically grounded to the solenoid valve housing 36.

With the sleeves 172 and 174 positioned around the transducer, high pressure gas in the passage 120 is prevented from leaking upwardly either between the lower sleeve and the transducer or between the lower sleeve and the housing 36. With the arrangement of FIG. 4A, two seals in tandem are provided to preclude fluid flow along either of those paths. The O-rings 176 and 178 seal against fluid flow along the outer circumference of the lower sleeve 172. The O-ring 178 additionally provides a seal against fluid flow along the inner surface of the lower sleeve. Further, with the nut 180 pressing down against upper sleeve 174, that sleeve presses down against the enlarged portion 179 of transducer 112. The enlarged portion in turn presses down against the plastic sleeve 172 to form a fluid seal therebetween. The lower end 181' of the nut 180 is of a reduced diameter in order to concentrate the downward forces through the sleeve 174 onto the enlarged diameter portion 179 of the transducer 112.

In order to provide a more isolated electrical circuit to the transducer than is possible with the transducer connected to a grounded housing exposed to the marine environment, the embodiment of FIG. 4A uses two electrical leads 184 and 186 each insulated from the housing 36 and each embedded in the potting material 142. The wires 184 and 186 pass through a silicon rubber bulkhead 188 into the bore hole 135 and connect with twin leads from the transducer 112. The bore hole 135 is filled with a soft potting material 190, for example such as marine caulking material.

With the embodiment of FIG. 4A, if it should ever become necessary to replace the transducer 112, the cap 133 is removed as before. The thus exposed soft potting material 190 can then be removed by any suitable tool to expose the transducer 112 and its retaining nut 180. The nut 180, transducer 112 and sleeves 172 and 174 can then be easily removed and the transducer can be replaced with the wires 184 and 186 being connected to the twin leads of the replacement transducer.

If for some reason the air gun should misfire or malfunction, either a trigger signal will be applied on line 32 and no signal pulse will be transmitted on line 30, or a signal will be transmitted on line 30 without a solenoid trigger signal having been applied. If the single malfunctioning air gun is shut down, surveying operations can still continue. To this end, it is only necessary that a continuous flow of current be sent through the appropriate line 32 to be applied to the solenoid winding 70 to hold the valve plunger 82 in its actuated (raised) position. Thus, the plunger closes the radial gas inlet ports 98 and prevents any further charging of that air gun. Each air gun is controlled individually through its solenoid valve; thus, it is not necessary that each air gun be supplied with pressurized gas through a separate line.

It will be understood that the continuous flow of current may be applied over the control line 32 to the misfiring or malfunctioning air gun by any convenient expedient which the survey crew may wish to use. For example, a source of direct current such as a battery 165 or a direct current power supply can be manually connected by a switch 167 to the appropriate electrical control line 32. In view of the fact that the solenoid plunger 82 requires a considerably greater magnetic force to initiate its upward movement than is required to hold it in its actuated position (FIGS. 5 and 8), the voltage of the direct current source 165 is considerably less than the voltage of the firing pulses from the control circuit.

Consequently, in order to shut off an air gun, the procedure may be as follows. The switch 167 is closed to the appropriate line 166. Then a firing pulse is transmitted to the gun to be shut off, while the switch 167 remains closed. Accordingly, the desired valve plunger 82 is moved, and then it is held in its actuated position by the continuous flow of current from the dc source 165.

The control circuit 29 may include isolating diodes associated with each of the leads 32 for preventing the current flow from the source 165 from entering the circuit 29 while permitting the firing pulses to be transmitted from circuit 29 over the lines 32.

If desired, such a direct current power supply as shown at 165 may be provided in a control console 161 (FIG. 1) which is connected to the air gun shot monitoring and control circuit 29. Such a control console may include respective rows of signal lights 162 and 164, with one of the lights in each row corresponding with a designated air gun and being arranged to be turned on in row 162 when a misfire (no fire or leakage) occurs and to be turned on in row 164 when a malfunction (auto fire) occurs. The direct current power supply within the console 160 may be automatically connected to feed a steady flow of direct current through the appropriate one of the shut off lines 166 leading to the control lines 32. If desired, manual switches 168 may be provided in the console 160 for manually connecting a dc power supply to any one of the shut off lines 166.

Returning attention to the solenoid valve housing 36, as shown in FIGS. 4 and 5, it includes O-ring seals 170 at appropriate locations for providing a waterproof enclosure or for preventing leakage of the pressurized gas, which may be at a pressure of many atmospheres, for example, 1,500 to 4,500 p.s.i. or more, as is known in the art of seismic surveying using air guns.

I have recently found that the best mode for placing this invention into practice is to drill the passageway 120 (FIGS. 4 and 5) as shown dashed at 120a through to the lower end of the solenoid valve housing 36 and to provide a communicating passage 69 (FIGS. 3 and 4) extending directly down into the upper portion 60 of the operating chamber 48. The laterally extending passageway 121 is then omitted. The advantage of the passageway 69, 120a, 120 is that it provides an essentially straight-line communication between the upper chamber portion 60 and the sensor 66, so that the pressure pulse occurring in the upper chamber portion 60 upon upward motion of the shuttle is transmitted most directly and forcibly to the sensor 66.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. In a method of controlling the firing of an air gun, said air gun including a shuttle movable within an operating chamber in response to actuation of a solenoid valve to abruptly release pressurized gas from a pressurized gas charge chamber, the invention comprising shutting off the supply of pressurized gas to both said operating chamber and charge chamber by means of said solenoid valve upon continuous actuation of said solenoid valve and initiating firing of said air gun upon intermittent actuation of said solenoid valve into its supply shut-off position.

2. A method of controlling the firing of an air gun as claimed in claim 1, further comprising:
   sensing variations in gas pressure in said air gun caused by movement of said shuttle;
   detecting a misfire or malfunction of the air gun based on said sensed gas pressure variations; and
   continuously actuating said solenoid valve once a misfire or malfunction of the air gun is detected for shutting off the entire supply of pressurized gas to such air gun.

3. A method of controlling the firing of an air gun as claimed in claim 2, wherein said pressurized gas is supplied to said operating chamber and said gas pressure is sensed through a common port.

4. In a method of monitoring the operation of an air gun, said air gun having a solenoid valve housing mounted thereon containing a solenoid valve and said air gun including a shuttle suddenly movable within an operating chamber in response to actuation of the solenoid valve for firing the air gun by abruptly releasing pressurized gas from a charge chamber in the air gun, the invention comprising:
   mounting a pressure transducer within said solenoid valve housing;
   providing fluid communication between said transducer and said operating chamber for sensing the pressure pulse in said operating chamber caused by the sudden movement of the shuttle at said firing;
   thereby monitoring the firing of the air gun.

5. A method of monitoring the operation of an air gun as claimed in claim 4, further comprising:
   supplying pressurized gas to said air gun through said solenoid valve housing; and
   using said solenoid valve for shutting off the entire supply of pressurized gas to the air gun in the event of misfiring or malfunctioning thereof.

6. A solenoid valve assembly suitable for use in controlling the movement of a shuttle to fire an air gun, said valve assembly comprising:
   a solenoid valve for initiating firing of said air gun and for shutting off the entire supply of pressurized gas to said air gun when actuated, and
   a fluid pressure sensor for detecting variations in fluid pressure caused by movement of said shuttle.

7. A solenoid valve assembly as claimed in claim 6, wherein said solenoid valve and said fluid pressure sensor are in fluid contact with a shuttle operating chamber in the air gun through a common port.

8. An air gun as claimed in claim 6, wherein:
   said solenoid valve and said fluid pressure sensor are in fluid communication with a shuttle operating chamber in the air gun through two separate ports.

9. A solenoid valve assembly as claimed in claim 6, wherein:
   said fluid pressure sensor is removably mounted within said solenoid assembly for ease in replacement without otherwise dismantling said air gun.

10. A solenoid valve assembly as claimed in claim 9, wherein:
    said fluid pressure sensor is an electrical transducer and electrical contact is made to said transducer through jumper contacts removable from said solenoid valve assembly to disconnect said pressure sensor.

11. A marine seismic survey system comprising:
    a plurality of air guns, each fired by movement of a shuttle;
    a single solenoid valve associated with each air gun, each such solenoid valve performing the function to initiate movement of the respective shuttle upon reception of a trigger signal and also performing the function to cut off the entire supply of pressurized gas to the respective air gun when actuated by a continuous signal;
    a fluid pressure sensor associated with each air gun to sense an abrupt fluid pressure variation caused by movement of the respective shuttle with firing of that air gun;
    a central electronic processor for receiving electrical sensor signals from each of said fluid pressure sensors for providing electrical trigger signals along control lines to each of said solenoid valves to initiate precise firing of said air guns according to a predetermined timing relationship; and
    said central electronic processor providing a continuous solenoid actuating signal along a control line when a misfire or malfunction of the respective air gun is detected from the sensor signal for shutting off the entire supply of pressurized gas to the respective air gun which misfires or malfunctions.

12. A marine seismic survey system as claimed in claim 11, in which:
    the solenoid valve associated with each air gun has a housing, and
    the fluid pressure sensor associated with each air gun is mounted within the housing of the solenoid valve.

13. A marine seismic survey system comprising:
    a plurality of air guns, each fired by movement of a shuttle;
    a dual action solenoid valve associated with each air gun for initiating movement of the respective shuttle upon momentary actuation and for shutting off the entire supply of pressurized gas to the respective air gun when continuously actuated;
    a fluid pressure sensor associated with each air gun to sense an abrupt fluid pressure increase caused by movement of the respective shuttle in firing of that air gun;
    a central electronic processor for receiving electrical sensor signals from each of said fluid pressure sensors for providing electrical trigger signals along control lines to each of said solenoid valves to initiate precise firing of said air guns according to a predetermined timing relationship; and
    current supply means associated with said processor for providing a continuous solenoid actuating signal along a control line to a respective solenoid valve when a misfire or malfunction of the respective air gun is detected from the sensor signal for shutting off the entire supply of pressurized gas to that respective air gun.

14. A solenoid valve assembly adapted for use in controlling the firing of an air gun comprising:
- a valve stem;
- an annular plunger having a bore surrounding said valve stem and said plunger being axially movable with respect to said valve stem;
- at least one pressurized gas supply port for supplying pressurized gas to an air gun, said supply port being located in said valve stem near one axial end portion;
- at least one air gun control port for triggering firing of an air gun, said control port being located in said valve stem near the other axial end portion;
- first and second seals associated with said supply and control ports, respectively;
- spring means normally urging said annular plunger against said second seal for normally closing said control port while said supply port remains open; and
- said annular plunger being axially moved upon actuation of the solenoid valve away from said first seal into contact with said second seal for momentarily opening said control port for initiating firing of the air gun upon momentary actuation of said solenoid valve and for continuously closing off said supply port for shutting off the supply of pressurized gas during continuous actuation of the solenoid valve.

15. A solenoid valve assembly as claimed in claim 14, in which:
- said annular plunger on the end thereof which comes into contact with said first seal has a lip;
- said lip being defined by an inner surface which slopes radially inwardly toward the bore and downwardly away from the rim of said lip;
- said lip also being defined by an outer cylindrical surface which extends axially straight downwardly away from the rim of said lip;
- said cylindrical surface of the lip has a predetermined diameter;
- the bore of said plunger has the same diameter;
- there is a reduction in said bore near said end of the plunger for forming a shoulder in said bore facing away from said lip and having the same effective area as the inwardly sloping surface of said lip; and
- said shoulder and said inwardly sloping surface of the lip are both exposed to the pressure of pressurized gas in said supply port for equalizing the resultant axial force produced on the plunger by the pressurized gas.

16. A solenoid valve assembly as claimed in claim 14 and including a housing, in which:
- said housing is adapted to have a fluid pressure transducer mounted therein in fluid communication with the interior of the air gun for sensing a sudden variation of fluid pressure therein occurring upon firing of the air gun.

17. A solenoid valve assembly adapted for use in controlling and monitoring the firing of an air gun comprising:
- a housing for mounting on an air gun;
- a solenoid valve in said housing for triggering the firing of the air gun; and
- a pressure sensor in said housing for sensing a sudden pressure increase in the air gun occurring upon the firing of the air gun for monitoring the firing of the air gun.

18. A solenoid valve assembly adapted for controlling and monitoring the firing of an air gun as claimed in claim 17, in which:
- said solenoid valve housing has a first end thereof for mounting onto an air gun;
- said housing has a receptacle at the other end thereof for receiving the pressure transducer mounted in said receptacle; and
- said housing has a passage extending from said receptacle to said first end for communicating with a passage leading into the air gun for sensing a sudden pressure increase in the air gun occurring upon firing thereof for monitoring the firing of the air gun.

19. In marine seismic surveying wherein a plurality of air guns are towed behind a survey vessel and each air gun has a shuttle for holding a charge of compressed air within the respective air gun and a solenoid valve which is electrically actuatable for triggering the firing of the air gun, putting the shuttle into rapid motion for abruptly releasing the charge of compressed air from the air gun and wherein a source of compressed air on the survey vessel is used to supply compressed air to the respective air guns, the improved method comprising the steps of:
- supplying the compressed air from the source on the survey vessel to the plurality of air guns by passing the compressed air through the respective solenoid valves;
- monitoring the firing of each air gun for detecting the misfiring or malfunctioning thereof; and
- continuously actuating the solenoid valve of a misfiring or malfunctioning air gun for shutting off the entire supply of air to that particular air gun;
- thereby enabling the seismic surveying to continue without significant interruption in spite of such inoperative air gun.

20. In marine seismic surveying wherein a plurality of air guns are towed behind a survey vessel, the improved method as claimed in claim 19, including the steps of:
- supplying the compressed air from the source on the survey vessel to the plurality of air guns by feeding the compressed air through a common high pressure hose line communicating with the respective solenoid valves for the plurality of air guns.

21. In marine siesmic surveying wherein a plurality of air guns are towed behind a survey vessel, the improved method as claimed in claim 19, including the steps of:
- sensing variations in air pressure within the respective air guns for said monitoring of the firing of each air gun.

22. In a solenoid valve assembly adapted for use in actuating the firing of an air gun having a shuttle which travels at high velocity during firing and in which a sudden increase in pressure occurs ahead of the moving shuttle, the improvement comprising:
- a solenoid valve housing of said assembly having a first end adpated to be mounted onto the air gun to be actuated;
- the other end of said solenoid valve housing having a socket therein;
- a pressure sensor transducer mounted in said socket;
- a removable cover secured to said housing over said socket for protecting said transducer and for providing access to said transducer; and
- said housing having a passage extending from said socket to said first end of said housing for communicating with a passage leading into the air gun into a position ahead of the moving shuttle for transmitting to said transducer the sudden increase in pressure occurring within the air gun when it is fired.

23. In a solenoid valve assembly adapted for use in controlling the firing of an air gun, the improvement as claimed in claim 22, in which:
   said pressure sensor transducer has a smaller diameter than said socket; and
   electrically insulating sleeve means surrounding at least a portion of said transducer for supporting the transducer in said socket end for electrically insulating the transducer from the housing of the solenoid valve.

24. An air gun comprising:
   a shuttle which is accelerated within an operating chamber when said gun is fired; and
   a solenoid valve in fluid contact with said operating chamber, said solenoid valve initiating movement of said shuttle and shutting off supply of pressurized gas to said operating chamber when actuated;
   said solenoid valve including:
   a valve stem having at least one radial pressurized gas inlet port and at least one axially spaced radial control port therein;
   plunger axially movable with actuation of said solenoid valve from a first position in engagement with a first seal to a second position in engagement with a second seal;
   said plunger when in its first position closing said control port and not said gas inlet port and when in its second position closing said gas inlet port and not said control port.

25. A solenoid valve assembly suitable for use in controlling the firing of an air gun, said valve assembly comprising:
   at least one pressurized gas inlet port for supplying pressurized gas to an air gun;
   at least one air gun control port for triggering firing of said air gun; and
   a plunger axially movable with actuation of said solenoid valve from a first position in engagement with a first seal to a second position in engagement with a second seal;
   said plunger when in its first position closing said control port and not said gas inlet port and when in its second position closing said gas inlet port and not said control port;
   said gas inlet port and said control port being radial ports in a valve stem;
   said gas inlet port being connected to a pressurized gas supply through an axial fluid passage in said valve stem; and
   said control port being connected to said air gun assembly through an axial fluid passage in said valve stem.

26. A solenoid valve assembly suitable for use in controlling the firing of an air gun, said valve assembly comprising:
   at least one pressurized gas inlet port for supplying pressurized gas to an air gun;
   at least one air gun control port for triggering firing of said air gun; and
   a plunger axially movable with actuation of said solenoid valve from a first position in engagement with said first seal to a second position in engagement with a second seal;
   said plunger when in its first position closing said control port and not said gas inlet port and when in its second position closing said gas inlet port and not said control port;
   said gas inlet port and said control port being radial ports in a cylindrical valve stem; and
   said plunger being an annular plunger surrounding said valve stem and having at least one axial fluid passage therethrough.

27. A solenoid valve assembly suitable for use in controlling the firing of an air gun, said valve assembly comprising:
   at least one pressurized gas inlet port for supplying pressurized gas to an air gun;
   at least one air gun control port for triggering firing of said air gun; and
   a plunger axially movable with actuation of said solenoid valve from a first position in engagement with a first seal to a second position in engagement with a second seal;
   said plunger when in its first position closing said control port and not said gas inlet port and when in its second position closing said gas inlet port and not said control port;
   said plunger having a seal-engaging lip and a shoulder facing in opposite axial directions;
   both said lip and said shoulder being adjacent to and in fluid communication with said gas inlet port when said plunger is in its second position; and
   said lip and said shoulder defining oppositely directed surfaces of equal effective area with fluid pressure on said shoulder balancing fluid pressure on said lip.

28. A solenoid valve assembly as claimed in claim 27, wherein the lip is chamfered sloping inwardly and downwardly toward said gas inlet port.

29. A solenoid valve assembly as claimed in claim 27, wherein said plunger is annular and said lip and said shoulder form opposite ends of an annular inwardly extending portion of said plunger, the greatest diameter of said lip equaling the greatest diameter of said shoulder.

30. A solenoid valve assembly suitable for use in controlling the firing of an air gun, said valve assembly comprising:
   at least one pressurized gas inlet port for supplying pressurized gas to an air gun;
   at least one air gun control port for triggering firing of said air gun; and
   a plunger axially movable with actuation of said solenoid valve from a first position in engagement with a first seal to a second position in engagement with a second seal;
   said plunger when in its first position closing said control port and not said gas inlet port and when in its second position closing said gas inlet port and not said control port;
   said plunger being annular and including an annular step at one end thereof, and
   said plunger being within a plunger housing having a surface parallel to said step and closely spaced from said step when said solenoid is actuated for providing a low reluctance magnetic circuit to hold said plunger in its actuated position when it is desired to keep said gas inlet port closed.

31. A solenoid valve assembly suitable for use in controlling the movement of a shuttle to fire an air gun said valve assembly comprising:

a solenoid valve for initiating firing of said air gun and for shutting off supply of pressurized gas to said air gun when actuated, and a fluid pressure sensor for detecting variations in fluid pressure caused by movement of said shuttle;

said fluid pressure sensor being removably mounted within said solenoid assembly for ease in replacement without otherwise dismantling said air gun;

said fluid pressure sensor being an electrical transducer and electrical contact being made to said transducer through jumper contacts removable from said solenoid valve assembly to disconnect said pressure sensor; and said jumper contacts being held in place within said assembly by a resilient pad held against said jumper contacts by a removable fluid tight cap.

32. In an air gun having an operating chamber and a firing chamber with a shuttle which is suddenly moved within the operating chamber for abruptly discharging pressurized gas from the firing chamber when said gun is fired and wherein both said operating chamber and said firing chamber are supplied with pressurized gas at the same supply pressure, a solenoid valve in fluid contact with both said operating chamber and said supply chamber, said solenoid valve initiating movement of said shuttle and shutting off the supply of pressurized gas to both of said chambers when said solenoid valve is actuated, whereby the entire supply of pressurized gas to both of said chambers of the air gun can be conveniently shut off by continuous actuation of said solenoid valve in the event of malfunction or misfiring of the air gun.

33. In an air gun, a solenoid valve as claimed in claim 32 wherein said solenoid valve is positioned in a solenoid valve housing mounted to the housing of the air gun, said air gun further comprising:

a fluid pressure sensor mounted in said solenoid valve housing and being in fluid contact with said operating chamber for detecting variations in fluid pressure caused by shuttle motion occurring in firing of the air gun.

34. In an air gun, a solenoid valve as claimed in claim 33, wherein said solenoid valve and said fluid pressure sensor are in fluid contact with said shuttle operating chamber through a common port.

35. In an air gun, a solenoid valve as claimed in claim 33, wherein said fluid pressure sensor mounted in said solenoid valve housing is in direct communication with said operating chamber through a passageway in said housing leading into said operating chamber for transmitting to said sensor the sudden increase in fluid pressure in said operating chamber caused by the sudden shuttle motion during firing of the air gun.

36. In an air gun having an operating chamber and a firing chamber with a shuttle which is suddenly moved within the operating chamber for abruptly discharging pressurized gas from the firing chamber when said gun is fired and wherein both said operating chamber and said firing chamber are supplied with presurized gas at the same supply pressure, a solenoid valve assembly in fluid communication with both said operating chamber and said firing chamber, said valve assembly comprising:

at least one pressurized gas inlet port for supplying pressurized gas to both of said chambers of the air gun, at least one air gun control port for triggering firing of said air gun, and a plunger axially movable upon actuation of said solenoid valve from a first position in engagement with a first seal to a second position in engagement with a second seal, said plunger when in said first position closing said control port and not said gas inlet port and when in said second position closing said gas inlet port and not said control port, whereby, in the event of malfunction or misfiring of the air gun, the entire supply of pressurized gas can advantageously be shut off from both of said chambers of the air gun by continuous actuation of said solenoid valve for continuously holding said plunger in said second position in engagement with said second seal.

37. In an air gun, a solenoid valve assembly as claimed in claim 36, in which:

a fluid pressure sensor is included in said valve assembly in communication with the end portion of said operating chamber in which a sudden increase in pressure occurs when the shuttle suddenly moves as the air gun is fired for detecting whether the air gun is firing correctly or whether it is malfunctioning or misfiring.

38. In an air gun, a solenoid valve assembly as claimed in claim 37, wherein:

said fluid pressure sensor and said plunger are in fluid contact with said operating chamber through a common port.

39. In an air gun, a solenoid valve assembly as claimed in claim 37, in which:

said solenoid valve assembly includes a housing, and said fluid pressure sensor is removably mounted within said solenoid valve housing.

40. In an air gun, a solenoid valve assembly as claimed in claim 37, in which:

said solenoid valve housing has a first end thereof mounted on the air gun;

the other end of said housing has a recess therein in which said sensor is mounted; and said solenoid valve housing has a passage extending from said recess to said first end of the housing and communicating with a passage leading into said end portion of said operating chamber of the air gun for sensing said sudden increase in pressure when the air gun is fired.

41. A monitoring and control unit adapted to be mounted upon an air gun of the type having a shuttle which is suddenly moved from a first position toward a second position when the air gun is fired and wherein a sudden increase in pressure occurs at said second position when the shuttle is suddenly moving toward it, said monitoring and control unit comprising:

a solenoid valve for initiating firing of said air gun;

a fluid pressure sensor for detecting increases in fluid pressure at said position caused by such sudden movement of the shuttle;

said solenoid valve and said fluid pressure sensor being housed within a solenoid housing adapted to be mounted as a unit onto the air gun;

said housing having at least one passageway communicating with the interior of the air gun at said second position when said housing is mounted on the air gun; and said fluid pressure sensor communicating with such passage for detecting such sudden increase in fluid pressure;

thereby enabling air guns to be conveniently monitored and controlled by mounting such unit thereon.

42. A monitoring and control unit adapted to be mounted upon an air gun of the type as recited in claim 41, wherein said shuttle suddenly moves from a first position toward a second position in an operating chamber within the air gun and a sudden increase in pressure occurs in the end portion of the operating chamber toward which the shuttle suddenly moves, in which:

said solenoid valve and said fluid pressure sensor are in fluid communication with said end portion of the operating chamber through a common port in the air gun.

43. A monitoring and control unit as clamied in claim 42, in which:

said unit can be mounted upon existing air guns without significant modifications thereto.

44. A monitoring and control unit adapted to be mounted upon an air gun of the type as claimed in claim 41, wherein said shuttle suddenly moves from a first position toward a second position in an operating chamber in the air gun and a sudden increase in pressure occurs in the end portion of the operating chamber toward which said shuttle suddenly moves, in which:

said solenoid valve and said fluid pressure sensor are in fluid communication with said end portion of the operating chamber through separate ports.

* * * * *